Figure 1:
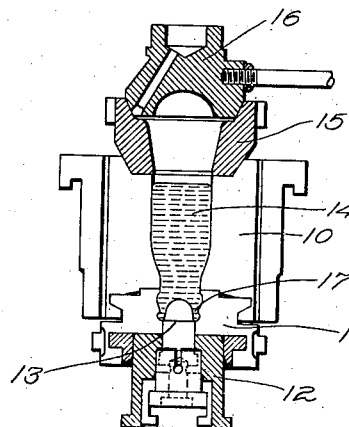

Feb. 17, 1942.   W. K. BERTHOLD   2,273,777
METHOD OF FORMING BLOWN GLASS ARTICLES
Filed Dec. 28, 1938

Witness
W. B. Thayer.

Inventor:
Walter K. Berthold
by Brown & Parham
Attorneys

Patented Feb. 17, 1942

2,273,777

UNITED STATES PATENT OFFICE 2,273,777

METHOD OF FORMING BLOWN GLASS ARTICLES

Walter K. Berthold, Rockville, Conn., assignor to Hartford-Empire Company, Hartford, Conn., a corporation of Delaware Application December 28, 1938, Serial No. 248,082

9 Claims. (Cl. 49—80)

This invention relates to the manufacture of blown glass articles, such as bottles, jars, flasks, etc., involving the introduction of air under pressure into charges of glass in inverted or neck-down parison or blank molds to counterblow glass of the charges against the walls of the cavities of such molds, transfer of the counterblown parisons or blanks to final blow molds, and blowing of the transferred parisons or blanks to final form in such final blow molds.

According to the "narrow neck" method, above generally described, a charge of glass is delivered to and compacted or caused to settle in the cavity of an inverted or neck-down blank or parison mold, the glass of the charge extending from the neck portion of the mold cavity part of the way up the sides thereof. A baffle plate is placed on the uppermost end of the inverted blank or parison mold and air under pressure is applied to the interior of the glass in the mold to counterblow such glass into conformity with the internal configuration of the blank or parison mold and against the baffle plate. Thereafter, the counterblown blank or parison is transferred to an upright final blow mold in which the blank or parison is disposed in an upright or neckup position and air under pressure is applied to the interior thereof. The counterblown blank or parison is thus expanded to the configuration of the final blow mold cavity, thereby forming an article of the final shape and size desired.

This method of forming blown articles of glassware has certain faults and shortcomings. A common defect is the presence of "settle waves" in the side walls of the article, marking the juncture of wall portions of two different thicknesses. Other common defects are baffle marks and shear scars in the bottoms of the article.

Still further, articles of generally circular cross-sectional configuration are usually excessively thick at their bottoms and relatively thin at their shoulders. Articles of generally rectangular cross-sectional configuration or so-called "panels" are usually excessively thick at the sides or panels and relatively thin at the shoulders. Different portions of practically all articles produced by the narrow neck method vary substantially in the thickness of the walls thereof. Consequently, for an article of a given size and intended use, it has heretofore been necessary to use a glass charge of undue size and weight so as to insure that the article produced will be thick and strong enough at its thinnest wall to enable the article to meet the requirements of the service for which such article is intended. The upper limit of the temperature of the glass of such a charge is lower than would be equally suitable if the charge were substantially smaller. The upper limit of the temperature and the size and weight of the charges required for formation by the narrow neck method into successive articles of a particular description have a direct bearing on the rate of production of such articles. This rate is kept undesirably low by the relatively great size and weight and relatively low temperature of the charges required when the narrow neck method is employed.

An object of the invention is to provide a novel method of forming blown hollow glass articles that will in part follow some steps of the well known commonly practiced "narrow neck" method of forming glassware but will differ therefrom as a whole and in important particulars so as substantially to reduce or eliminate certain shortcomings and faults of the narrow neck method.

A further object of the invention is to provide a novel method of forming blown hollow glass articles so that the walls of each such article will be substantially uniform in thickness throughout all portions thereof, whereby an article of a given size may be formed of a charge substantially smaller than is required for the same article when it is formed by the narrow neck process.

A further object of the invention is to provide a novel method of forming blown articles of glassware by which conventional "hot" metal molds may be employed for the manufacture of articles previously requiring the use of paste molds.

A further object of the invention is to provide a novel method of forming blown hollow glass articles having relatively thin walls of uniform thickness so that articles heretofore made by hand blowing may be made by machinery.

A further object of the invention is to provide a method of forming blown glassware which will afford reliable and efficient control of the distribution of the glass of a charge to the various portions of the walls of the article being formed.

A further object of the invention is to provide a method of forming blown glassware in such a way and by such steps that articles of any given capacity may be produced at a higher rate than by the narrow neck method.

A further object of the invention is to provide a method of forming blown articles of glassware so that such articles will be of better optical appearance than those produced by the narrow neck method prior to the present invention.

Shortcomings and faults of the narrow neck method are substantially reduced or completely eliminated by the method of the present invention. Better control of the distribution of glass throughout the walls of the article is obtained. This permits such article to be made with thin walls of uniform thickness and hence permits an article of a given size and given strength to be of substantially less glass than required according to the narrow neck method. For example, I have found that milk bottles of 1 qt. capacity heretofore made of charges weighing approximately 25 ounces may be made, by the method of the present invention, of charges of 10 ounces or even less. Stubby beer bottles, heretofore made of charges of approximately 10 ounces in weight, may be made according to the new method of charges from 3½ to 6 ounces in weight. Still other blown glass articles may be made by my novel method of charges of proportionately reduced weight. In brief, in view of the control of the distribution of the glass of a charge to the component walls of an article being formed thereof by the method of the present invention, the amount of glass required for the article may be substantially reduced, the lower limit of such amount being determined by the requirements of the tests which the article must satisfy after it has been annealed or tempered in any suitable known way.

I have found that by my new method I can manufacture by the use of machinery, including the usual "hot" metal molds, articles which previously required the use of "paste" molds or hand blowing operations. Among such articles are thin walled tumblers and flasks and like articles, such for example, as the component inner and outer thin-walled parts of thermos bottles. The charges may be at a higher temperature than when the narrow neck method is employed and this makes for higher rates of production of the articles and better optical appearance of the walls thereof.

In carrying out the present invention, I make use of an inverted or neckdown blank or parison mold to which a charge of glass is supplied in any suitable manner, as from an automatic feeder. This blank or parison mold has a cavity that preferably is relatively short in relation to the length of the final article desired and of such dimensions that the charge of glass will fill the blank or parison mold cavity to from 85% to 96% of its effective capacity when the neck pin is in projected position in the neck portion of the blank or parison mold.

After the charge of glass has been compacted or caused to settle in the blank or parison mold cavity about the usual neck pin in the neck end portion thereof, a baffle is disposed on the upper end of the blank or parison mold. This baffle has a recessed cavity, of appropriate configuration and dimensions to constitute an upward continuation of the cavity of the blank or parison mold so that no angular recess or corner exists at the juncture of the cavity of the baffle with the cavity of the inverted blank or parison mold.

Counterblowing air is then applied to the interior of the glass in the blank or parison mold to expand such glass against the walls of the blank or parison mold and baffle cavities. This counterblowing air may be at the usual pressure, as 15 lbs. or higher.

Thereafter, the baffle is removed and a low pressure air, as air at a pressure of from 3 lbs. to 7 lbs., is applied to the interior of the counterblown blank or parison. The distribution of glass of the blank or parison in the inverted blank or parison mold will project the upper portion of the glass blank or parison body upwardly beyond the inverted mold, thus causing the glass thereof to pull away from the wall of the cavity of the inverted blank or parison mold at its upper end only.

After the removal of the baffle and the puff blowing of the counterblown blank or parison by low pressure air to an extent and for a time which have been predetermined as best suited for the particular operation, the halves of the body of the blank or parison mold are opened. The inverted blank or parison which is then supported by the neck mold is further expanded by low pressure air, as by further puff blowing.

The puff blowing of the inverted or neckdown blank or parison, first after the baffle has been removed and while the blank or parison body mold is closed and then again after the latter has been opened have important beneficial results in cooperation with the other steps of my novel method in producing walls of uniform thickness in the final article and in eliminating "settle waves" and baffle and shear marks in the sides and bottom of such article.

Thereafter, the inverted blank or parison is swung through an arc of a circle to an upright final blow mold in such a way as to obviate any lateral distortion thereof. The blank or parison may be supported at its neck portion in an upright position with the body portion thereof pendent in the cavity of the final blow mold. The pendent body portion of the blank or parison may be permitted to sag downward by gravity until its lower end has touched the bottom of the final blow mold, at which time blowing air is applied to expand the parison against the walls of the blow mold cavity to form an article of the shape and size desired. The final blowing air may be applied earlier, if desirable for any particular article.

The duration and intensity of the puffs or applications of low pressure air applied to the inverted blank or parison control the distribution of glass for regulation of the thickness of the bottom of the final article.

Regulation of the thickness of the shoulders and side walls of the final article may be effected by regulation of the duration of contact of the glass in the blank or parison mold cavity with the side walls thereof.

The operations just described preferalby are effected by apparatus embodying improvements of the present invention applied to the well-known Hartford individual section forming machine, the parison body and final blow molds of which are supported on a stationary frame so as to be located at fixed stations at which the parison-forming and final blowing operations, respectively, are performed.

The present invention also has been disclosed in part in my copending application for "Method of forming blown articles of glassware," Serial No. 143,717, filed May 20, 1937, of which the present application is a continuation in part.

Figure 2:
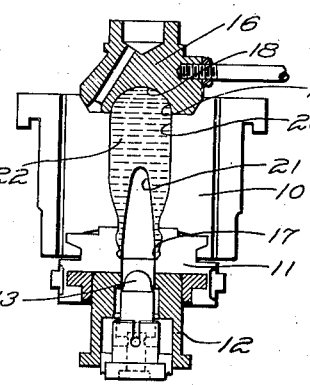
Figure 3:
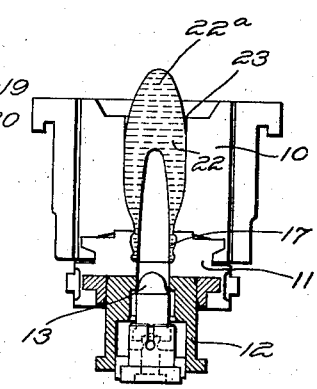
Figure 4:
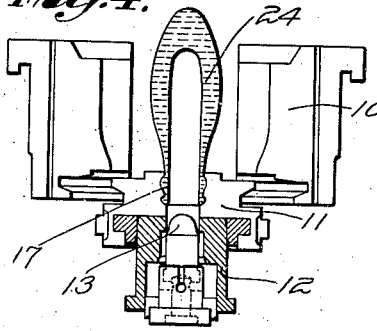
Figure 5:
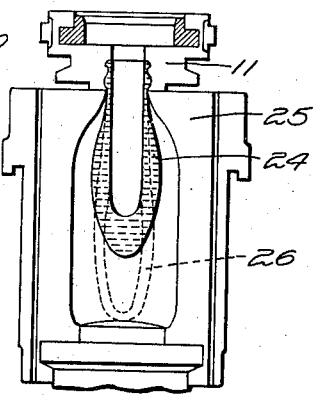
Figure 6:
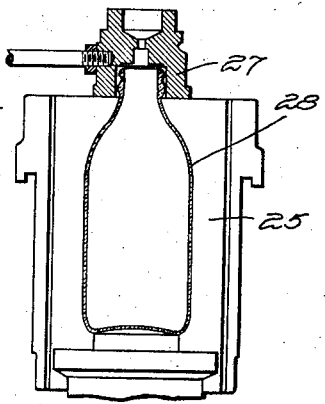
Figures 7, 8:
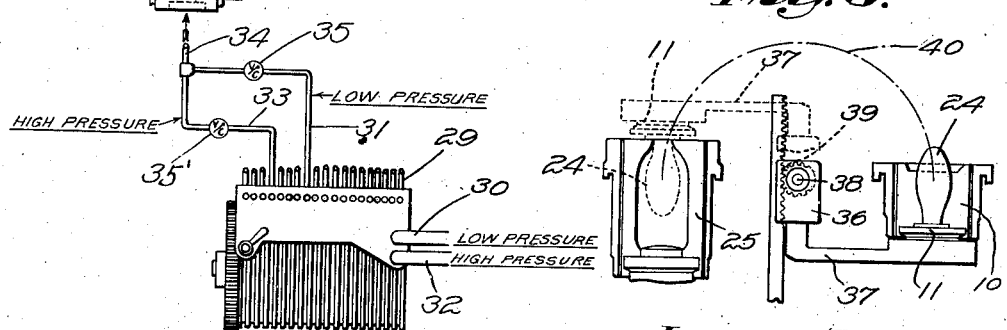

Various stages in the operation of manufacturing one particular article, i. e., a stubby beer bottle, and apparatus employed in such operation according to the present invention are illustrated in the accompanying drawing, in which:

Fig. 1 is a vertical sectional view of an inverted blank or parison mold having a charge of glass therein compacted around the neck pin for the formation of the neck finish of the article, glass settling or compacting air having been applied through the charge delivering funnel and the combined settle blow head and baffle that is shown on the funnel, Fig. 2 is a generally similar view after the funnel has been removed, the neck pin has been retracted downwardly, the baffle has been placed on the top of the inverted blank or parison mold and the glass in such mold has been counter-blown, Fig. 3 is a generally similar view showing the counterblown glass blank or parison after the baffle has been removed and low pressure air has been applied to the interior of such blank or parison, Fig. 4 is a similar view showing the development of the blank or parison by further low pressure air after the sections of the blank or parison mold body have been opened, Fig. 5 shows the blank or parison supported in reverted or upright position by the neck ring which rests on a final blow mold so that the body of the blank or parison depends within the cavity of such blow mold, the dotted lines showing the shape assumed by such blank or parison after it has sagged or stretched by gravity to the bottom of the blow mold, Fig. 6 shows the glass article as formed in the final blow mold by a final blowing pressure applied thereto through an associate blow head, Fig. 7 is a fragmentary, partly sectional and somewhat diagrammatic view, showing air lines, control means and a timer in association with the neck pin mounting and neck ring of the apparatus of the preceding views, and Fig. 8 is a diagrammatic view of a transfer mechanism by which the hollow blank or parison may be swung through an arc of a circle from the blank forming position to the blow mold without causing lateral distortion of any portion of such blank or parison.

Referring now to the drawing, I show apparatus for carrying out the method of the invention to form a stubby beer bottle.

This apparatus comprises a blank or parison mold comprising cooperative body and neck molds, indicated at 10 and 11, respectively. A neck pin mounting 12 carries a reciprocable neck pin 13 which may be projected into the neck mold, as shown in Fig. 1. A charge of glass 14 may have been delivered through a funnel 15 to the cavity of the blank or parison mold, which is in inverted or neck-down position at this stage of operations. The lower portion of the funnel may be seated in a counterbore at the top of the inverted blank or parison mold.

After the delivery of the charge of glass to the blank or parison mold, a combination settle blow head and bottom baffle 16 may be seated in a counterbore at the upper end of the funnel 15 and air under pressure may be applied through the interposed funnel 15 to the upper part of the cavity of the inverted blank or parison mold to cause settling or compacting of the glass of the charge in the blank or parison mold. This will form the neck finish portion 17 of the article being made and will cause intimate chilling contact of the glass at its lateral surface with the walls of the mold, to which heat passes from the glass.

After the stage of operations illustrated in Fig. 1, the funnel 15 may be removed and the combination settle blow head and baffle 16 then seated in the counterbore at the upper end of the inverted blank or parison mold body, as shown in Fig. 2. It will be observed that the member 16, which functions solely as a baffle or bottom plate when in the position shown in Fig. 2, has a cavity 18 provided with a side wall 19 which is of suitable configuration and transverse dimensions to form, in effect, an upward extension of the side wall 20 of the cavity of the body mold 10 so that there is no angular recess at the juncture of the baffle and the body mold. Consequently, when air under pressure, as under a pressure of 15 lbs. or more, is applied to the interior of the neck finish portion of the glass, the neck pin first having been retracted downwardly, the glass in the inverted blank or parison mold will be counterblown or expanded against the walls of the combined cavities of the body mold and baffle, as shown in Fig. 2, without any undue localized chilling of the surface portion of the glass at the juncture of the body mold and baffle. This operation will provide a so-called "bubble" or hollow 21 in the counterblown blank or parison 22, this hollow having an open lower end portion in the neck finish portion of the article and extending centrally of the blank or parison for part of the length thereof.

The counterblowing operation will be effective mainly on the relatively plastic glass at the interior of the charge in the body mold 10. However, as glass of the charge was already in contact with the wall of the cavity of the body mold for nearly the full length thereof, the glass that is moved longitudinally by the counterblowing pressure will be mainly received in the cavity of the baffle and will contact with a previously unfilled part of the cavity of the body mold only at the extreme upper end thereof. This feature of the invention aids in effecting elimination of "settle waves" in the walls of the final article.

The overall length of the blank or parison mold is substantially less than the length of the article being made. This difference of length has been found to be of importance in controlling the distribution of glass throughout all portions of the walls of the final article.

Referring to Fig. 3, a further important step of the method is illustrated therein. The baffle 16 has been removed and air under relatively low pressure, as at from 3 to 7 lbs., is applied to the interior of the counterblown blank or parison 22. This low pressure air will exert sufficient pressure on the more plastic glass at the upper end of the bubble 21 to expand the upper portion of the counterblown blank or parison until it protrudes in a substantially conoidal form above the upper end of the body mold, as indicated at 22a. This upward development of the hollow blank or parison will cause a sufficient stretching of the chilled skin or sack which laterally confines the more plastic glass of the body of the hollow blank or parison to break the chilling contact of the upper portion of the blank or parison with the extreme upper end portion of the cavity of the body mold, at the zone indicated at 23, without causing or permitting uncontrolled longitudinal movement and change of form of the body of the blank or parison, out of contact with the wall of the cavity of the body mold, such as would ensue were the blank or parison mold in upright or neck-up position.

The result of this operation is to elevate into the open air the portion of the hollow blank or parison in which the incipient settle waves would be formed in the usual narrow neck method of manufacture. This protruding upper portion of the body of the hollow parison also includes areas which are frequently marked or scarred by the baffle or shears in the narrow neck method of manufacture. The chilled surface or skin of the protruding portion of the blank or parison is thus permitted to reheat or soften somewhat while the remainder of the body of the counterblown blank or parison remains in contact with the walls of the cavities of the cooperative body and neck molds. The time during which this condition exists and the hollow blank or parison is in contact with the walls of the cooperative body and neck molds from the mouth of the neck portion thereof for a substantial part of the length the body of the blank or parison will control the distribution of the glass of the counterblown parison which subsequently will form the shoulders and side walls of the final article. The thickness of the bottom of the final article may be regulated within a considerable range by regulation of the time of beginning, duration and intensity of the puff blowing or application of low pressure air to the interior of the counterblown blank or parison.

As shown in Fig. 4, the sections of the body mold have been opened and further low pressure air has been applied to the interior of the hollow blank or parison, which is thereby expanded in an upward direction and in transverse dimensions. This hollow blank or parison, designated 24, is supported in an inverted or neck-down position by the neck portion thereof in the neck mold 11 so that the entire outer surface portion or skin of the body of the blank or parison is permitted to reheat or soften somewhat by heat from the hotter internal glass.

Before the softening or reheating of the external skin or surface portion of the blank or parison 24 has caused or permitted slumping or sagging of any portion of such blank or parison and before any undesirable change of form or dimensions of any portion thereof has taken place, the neck mold 11 and the parison are swung as a unit through an arc of a circle so that the neck mold will be supported in position to permit the halves of a blow mold 25 to be closed around the body of the blank or parison 24, as shown in full lines in Fig. 5. Thereupon the neck mold is opened and removed. At this stage, the blank or parison 24 is disposed in upright or neck-up position. Preferably, the body of the blank or parison 25 is permitted to sag by gravity, as shown by the dotted lines at 26 in Fig. 5 until the lower end thereof touches the bottom of the cavity of the blow mold. A blow head 27 has been placed over the neck finish portion of the parison in the final blow mold, as shown in Fig. 6. When the lower end of blank or parison touches the bottom of the final blow mold, air under pressure is applied through the blow head 27 to expand the walls of the cavity of the blank or parison to the configuration of the cavity of the final blow mold to form an article 28 of the shape and size desired.

In the example illustrated in the drawing, the article formed is a stubby beer bottle and in the practice of the novel method of the present invention, such bottle has been formed of charges ranging from 3½ to 6½ ounces as compared with charges of approximately 10 ounces as have been required prior to this invention for the manufacture of a similar article of the same capacity by the narrow neck method. The distribution of glass throughout all the walls of the article has been regulably controlled so that these walls are substantially uniform in thickness. This is in contrast with articles formed by the narrow neck method which ordinarily have walls varying substantially in thickness in different portions thereof.

The structural parts shown in the drawing and specifically referred to in the foregoing description may be supported and operated as described by any suitable mechanisms or combinations of mechanisms, preferably by those which are included for the same or similar purposes in the well known Hartford-Empire individual section forming machine. The timing of these operations may be controlled by any suitable timing mechanism, as by the Hartford I. S. timer, an example of which is shown in part in a somewhat diagrammatic manner at 29 in Fig. 7. This timer may control the times of application and durations of applications of the high pressure and low pressure air hereinbefore referred to. Thus the timer may control the flow of low pressure air from a supply line 30 to a delivery line 31 and the flow of high pressure air from a supply line 32 to a delivery line 33. The delivery lines 31 and 32 may unite in a common delivery pipe 34 for supplying air to the neck pin mounting 12 for application to the interior of the glass in the blank or parison mold in accordance with the procedure and by substantially the same arrangement of structure as is included in the Hartford I. S. machine. Check valves 35 and 35', respectively, are provided in the lines 31 and 33 to prevent back flow of pressure from either line through the other, it of course being understood that the timer controls these separate lines so that only high pressure air or low pressure air is being delivered to the final line 34 at any given time.

For transferring the parison from its inverted or neck-down position, as shown in Fig. 4, to its reverted or neck-up position, shown in Fig. 5, I preferably employ transfer mechanism similar to that which is included in the Hartford I. S. machine, an example of which is shown more or less diagrammatically in Fig. 8 and in detail in Patent 1,826,019, granted October 6, 1931 to Karl E. Peiler, assignor to Hartford-Empire Co. This transfer mechanism includes a carrier 36 which is operatively connected by an arm 37 with each of the sections of the neck mold 11. Only one of the arms 37 is shown. The carrier 36 is pivoted at 38 and is operated by a suitable rack bar and pinion arrangement, indicated at 39, so that the neck mold 11 and the parison 24 supported thereon will be swung along the arc of a circle from the position shown at the right hand side of Fig. 8 to the position shown in dotted lines at the left hand side of Fig. 8. This movement of the parison 24 is effected by a force exerted axially of the parison at all points along the arc of the circle indicated at 40 so that the parison 24 will be moved to its transfer position, at which the halves of the blow mold 25 may be closed around it, without causing any lateral distortion of any portion of the hollow blank or parison.

Certain of these claims define novel sub-combinations having new, useful combined functions or results as hereinbefore explained.

I wish it to be understood that I do not desire to be limited to the exact details shown and described, for obvious modifications will occur to a person skilled in the art.

What I claim is:

1. The method of forming a blown article of hollow glassware comprising the steps of placing a charge of molten glass in an inverted blank or parison mold, disposing a bottom baffle at the upper end thereof, counterblowing the glass of the charge against the walls of the mold cavity and said baffle, removing said baffle, introducing further air under pressure to the interior of the counterblown blank or parison while confining the body of said blank or parison against lateral expansion to effect upward expansion only of the counterblown blank or parison in such manner as to break lateral contact of the glass of said blank or parison with the upper end portion of the wall of the cavity of said mold, opening the body of the blank or parison mold to leave the hollow blank or parison laterally unsupported above its lower end portion, introducing further air under pressure into said laterally unsupported hollow blank or parison to expand it both in an upward direction and in its transverse dimensions, and blowing the hollow blank or parison thus formed to the shape and size of the article desired.

2. The method of forming a blown article of hollow glassware which comprises placing in an inverted or neck-down blank or parison mold a charge of glass of sufficient size to fill the cavity of said mold to from 85% to 96% of its effective capacity, placing a bottom baffle at the upper end of the inverted mold, applying air under pressure to the interior of the glass in said mold at the lower end thereof to counterblow the glass of the charge against the walls of the mold cavity and said baffle, removing said baffle, introducing air under pressure to the interior of the counterblown blank or parison while the body of the blank or parison is laterally confined above its neck portion to break lateral contact between the glass of said blank or parison and the wall of the upper end portion of the cavity of said mold, opening the body of said mold to leave the body of the blank or parison unconfined above its neck portion, introducing further air under pressure to the interior of the hollow blank or parison while thus laterally unconfined, transferring the hollow blank or parison thus formed to a final blow mold and reverting it during said transfer so that the hollow blank or parison is supported in upright or neck-up position in the final blow mold, and blowing the hollow blank or parison to final form in said blow mold.

3. The method of forming a blown article of hollow glassware which comprises placing in an inverted or neckdown blank or parison mold a charge of glass of sufficient size to fill the cavity of said mold to from 85% to 96% of its effective capacity, placing a bottom baffle at the upper end of the inverted mold, applying air under pressure to the interior of the glass in said mold at the lower end thereof to counterblow the glass of the charge against the walls of the mold cavity and said baffle, removing said baffle, introducing air under pressure to the interior of the counterblown blank or parison while the body of the blank or parison is laterally confined above its neck portion to break lateral contact between the glass of said blank or parison and the wall of the upper end portion of the cavity of said mold, opening the body of said mold to leave the body of the blank or parison unconfined above its neck portion, introducing further air under pressure to the interior of the hollow blank or parison while thus laterally unconfined, transferring said hollow blank or parison to a blow mold having a length at the interior thereof substantially greater than the length of the hollow blank or parison and reverting the hollow blank or parison during the transfer thereof so that it will be supported at its neck portion at the top of the cavity of the blow mold with the body with the blank or parison depending into the cavity of the blow mold, permitting said hollow blank or parison thus supported in the final blow mold to elongate in a downward direction under the influence of gravity until the lower end thereof touches the bottom of the blow mold, and then introducing air under pressure into the elongated hollow blank or parison in the blow mold to blow said hollow blank or parison to form the final article desired.

4. The method of forming a blown article of hollow glassware having relatively thin walls of uniform thickness, comprising the steps of placing in an inverted or neck-down blank or parison mold a charge of glass of sufficient size to fill the cavity of the mold to from 85% to 96% of its effective capacity, placing on the upper end of the inverted blank or parison mold a baffle having a cavity formed to constitute an upward continuation of the cavity of the body of the blank or parison mold, counterblowing the glass in said mold against the walls of the cavities of the mold and said baffle by air under a pressure of approximately 15 lbs., removing said baffle, leaving the counterblown blank or parison laterally confined above its neck portion by the walls of the blank or parison mold, introducing air under a relatively low pressure of from approximately 3 lbs. to 7 lbs. to the interior of the counterblown blank or parison while it is thus laterally supported to expand it in an upward direction only in such manner as to break lateral contact of the glass of said blank or parison with the upper end portion of the wall of the cavity of said mold, opening the body of the blank or parison mold to laterally unconfine the body of the hollow blank or parison thus obtained, introducing further air under said relatively low pressure to the interior of the hollow blank or parison while its body is thus laterally unconfined to further expand said body of the blank or parison in an upward direction and also in its transverse dimensions, and thereafter blowing the hollow blank or parison thus obtained to form the final article desired.

5. The method of forming a blown article of hollow glassware which comprises the steps of placing in an inverted or neck-down blank or parison mold a charge of glass of sufficient size to fill the mold to from 85% to 96% of its effective capacity, counterblowing the glass in said inverted blank or parison mold against the walls of the mold cavity and a bottom baffle disposed at the upper end of the mold, removing the baffle while the body of the inverted blank or parison mold is left closed to confine laterally the glass thereof above the neck portion of the counterblown blank or parison, applying air under relatively low pressure to the interior of the counterblown blank or parison while the body thereof is thus laterally confined to expand it in an upward direction only in such manner as to break lateral contact of the glass of said blank or parison with the upper end portion of the wall of the cavity of said mold, regulating the application of said air under low pressure to said counterblown blank or parison to predetermine the thickness of the bottom of the final article being formed, opening the body of the blank or parison mold to leave the hollow blank or parison laterally unconfined above its neck portion, introducing further air under relatively low pressure to the interior of said laterally unconfined blank or parison, and thereafter blowing said hollow blank or parison to final form in a final blow mold.

6. The method of forming a blown article of hollow glassware which comprises the steps of placing in an inverted or neck-down blank or parison mold a charge of glass of sufficient size to fill the mold to from 85% to 96% of its effective capacity, counterblowing the glass in said inverted blank or parison mold against a bottom baffle disposed at the upper end of said mold, removing the baffle while the body of the inverted blank or parison is left closed to confine laterally the glass thereof above its neck portion, applying air under relatively low pressure to the interior of the counterblown blank or parison while the body thereof is thus laterally confined to expand it in an upward direction only in such manner as to break lateral contact of the glass of said blank or parison with the upper end portion of the wall of the cavity of said mold, regulating the application of said air under low pressure to said counterblown blank or parison to predetermine the thickness of the bottom of the final article being formed, opening the body of the blank or parison mold at a time regulated with respect to the time of beginning of lateral contact of the body of the hollow glass blank or parison with the walls of the blank or parison mold to predetermine the thickness of the shoulders and side walls of the final article being formed, introducing further air under relatively low pressure to the interior of the hollow blank or parison after said opening of the body of the blank or parison mold, and thereafter blowing the hollow blank or parison to final form in a final blow mold.

7. The method of forming a glass bottle or the like having thin walls of uniform thickness, which comprises feeding a charge of molten glass to a fixed inverted parison body mold and a neck mold having a composite cavity therein exceeding in size the charge by not over 15%, forming a parison in such body mold and neck mold at the fixed position of the body mold by blowing the charge downwardly to settle it in the neck mold and to force the glass into intimate contact with the parison body mold walls, closing the upper end of the mold by a baffle plate, counterblowing the charge upwardly against the baffle plate, removing the baffle plate and applying low pressure air to the interior of the parison to expand the glass upwardly beyond the closed parison body mold walls in such manner as to break lateral contact of the glass of said blank or parison with the upper end portion of the wall of the cavity of said mold, opening the parison body mold, applying low pressure air to further expand the parison upwardly and laterally, transferring the parison to an upright blow mold located at a fixed station and blowing it to final form therein.

8. In a method of forming a blown article of hollow glassware, the steps of compacting a charge of glass in an inverted blank or parison mold, counterblowing the charge against the walls of the mold cavity and against a metallic bottom baffle at the upper end of the inverted blank or parison mold, removing said baffle, further expanding the counterblown glass in an upward direction only and causing the glass of the blank or parison to be moved out of contact with the upper end portion of the wall of the cavity of said mold by introducing additional air under pressure to the interior of the counterblown glass after the removal of said baffle and while said glass is confined against lateral expansion by the walls of said inverted mold, and thereafter blowing the resultant hollow blank or parison to final form.

9. In a method of forming a blown article of hollow glassware, the steps of delivering a separated charge of glass to a fixed inverted parison body mold and a neck mold having in combination a cavity therein exceeding in size the charge by not over 15%, forming a parison in said cavity by blowing the charge downwardly to settle it in the neck mold about a neck pin therein and to force the glass of the charge into intimate contact with the parison body mold wall, closing the upper end of the inverted body mold by a baffle having a cavity at its bottom having a peripheral wall in register with and constituting an upward continuation of the peripheral wall of the adjacent end of the cavity of the inverted body mold, counterblowing the charge upwardly against the wall of the cavity of the baffle, removing the baffle, applying low pressure air to the interior of the parison to expand it upwardly beyond the closed parison body mold wall to break the contact of glass of said parison with said body mold wall at the upper end of the latter, thereafter transferring said parison to an upright blow mold located at a fixed station, and blowing said parison to final form in said upright blow mold.

WALTER K. BERTHOLD.